United States Patent Office 3,415,247
Patented Dec. 10, 1968

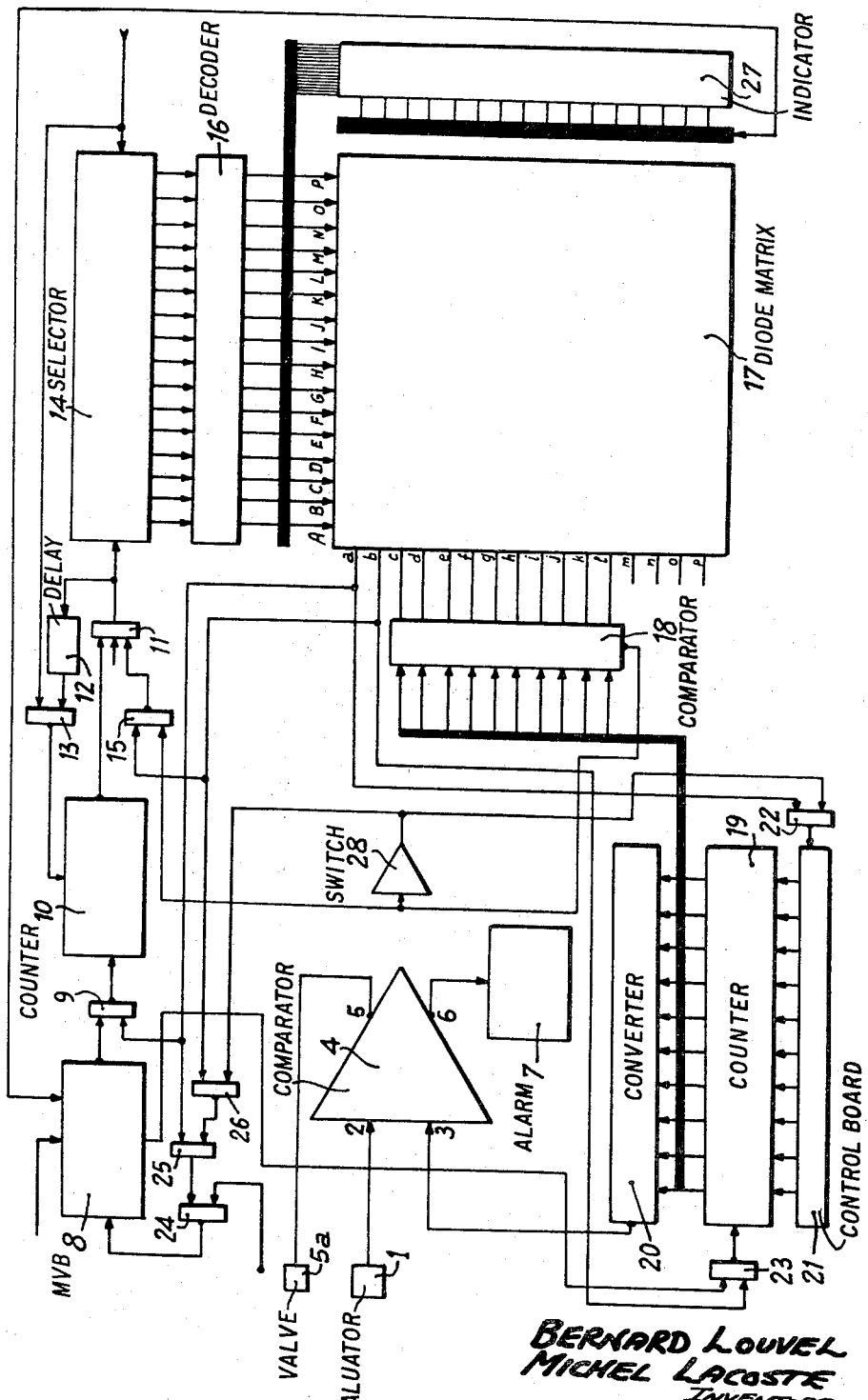

3,415,247
SEQUENTIAL PROGRAMMERS FOR AUTOMATIC DECOMPRESSION
Bernard Louvel, Buros, and Michel Lacoste, Pau, France, assignors to Societe Nationale des Petrole d'Aquitaine, Paris, France, a corporation of France
Filed Apr. 13, 1966, Ser. No. 542,256
Claims priority, application France, Apr. 16, 1965, 13,527
3 Claims. (Cl. 128—204)

It is well known that the human body cannot undergo, without harm, a rapid decompression after a certain time spent at a high pressure, for example in underwater diving. It is thus necessary to subject the diver to a progressive decrease in pressure, either by rising slowly from the depths, or by effecting a controlled decompression in a chamber provided for this purpose. The laws of decompression show that subjects undergoing a prolonged dive to a certain depth may be returned to a normal pressure at a predetermined speed. Similarly, any living being subjected to a given excess pressure, during a predetermined time and under diverse conditions, may be decompressed according to a given law.

The present invention has for an object an apparatus for automatically carrying out the decompression of the human body, by automatically subjecting the subject to lower and lower pressures as the time increases from a chosen instant, the programme of succession of the fixed pressures, maintained during a given, adjustable time, designated as degrees of decompression, and variations of pressure designated as linear decompressions, having been predetermined and set up on a diode matrix, said matrix sequentially effecting the connections necessary for permitting the opening and closing of a valve provided on a decompression chamber, which permits the pressure to be regulated to the desired level with the precision required. In this way, no harm can come to the subject undergoing decompression.

According to a feature of the invention, the decrease in pressure is obtained by the cyclic opening of an automatically controlled member, a valve for example, enabling the pressure in the said chamber to be taken to a given value upon each opening.

According to another feature of the invention, the control of the opening and closing of this member is ensured by a comparison component which compares a voltage proportional to the pressure prevailing in said chamber with a voltage supplied by an analogue-digital-converter connected to a digital counter, the contents of which vary by one unit each time a multivibrator has defined a period of time, even when there is no equality between the value of the contents of the counter and the value programmed for the following decompression step.

According to another feature of the invention, the comparison component is adapted to trigger an alarm when the pressure in said chamber is lower than it ought to be, said alarm being capable of controlling various operations such for example as the complete stopping of the decompression, followed by an optional recompression or any other necessary operation.

According to a further feature of the invention, all the orders given for one operation are formed by a series of elements placed on horizontal rows or vertical columns of a diode matrix arranged in a specific number of horizontal rows and vertical columns.

According to yet a further feature of the invention, the switching over from one row to the following is obtained by a programme selector associated with a decoder having $n$ positions, the advance movement of this programme selector being controlled by a pulse supplied by the multivibrator when the latter has effected a predetermined number of operations, or by a voltage coming from the diode matrix if certain conditions have been carried out.

In order that the invention may be more readily understood, reference will now be made to the accompanying drawing showing one arrangement according thereto by way of example.

In accordance with the invention, a subject who has made a dive to a great depth is enclosed in a sealed chamber at a selected depth, then returned to the surface, still subjected to the pressure. The apparatus or arrangement according to the invention is then connected to the chamber. The decompression programme, according to the established laws, is indicated on the diode matrix comprising vertical columns designated inclusively by the letters A–P and horizontal rows designated inclusively by the letters $a$–$p$. It provides a predetermined number of decompression steps and linear decompressions. The operation may be clearly defined with the aid of the drawing and the following explanation.

A diode matrix 17 maintains the initial pressure for the required time. Then a command coming from a multivibrator 8 defining the time causes a programme selector 14 to advance. A linear decompression is started. A pressure evaluator 19 delivers a certain voltage which causes the lack of balance of a comparison component 4, this causing a valve 5a, fixed to the chamber, to open, whilst there is lack of balance. When balance is obtained, the valve 5a is closed. The multivibrator gives a signal which again permits the pressure evaluator 1 to move, this again producing lack of balance, and causing the valve 5a to open. This procedure may be repeated all the time that the value of the pressure indicated on the diode matrix or grid 17 for the following step has not been achieved, the time constant of the multivibrator defining the speed of decompression.

In one embodiment of programme control, the apparatus may be used as follows, reference being made to the drawing.

A repeating potentiometer 1, forming a pressure evaluator, and supplying a voltage proportional to the pressure in the decompression chamber, is connected to the input 2 of the comparator 4. To the second input 3 of this comparator there is connected an analogue-digital-converter 20 whose operation will be described hereinafter. The output 5 of the comparator is connected to the decompression control valve 5a and the output fixed to an alarm which can control various operations. A multivibrator 8 defines a period of time with the aid of an RC circuit having switchable resistors, and supplies pulses at the output of a threshold trigger circuit. These pulses pass through the AND gate 9 if the authorisation therefore is given by the output $a$ of the diode matrix 17. The pulse is counted by the digital counter 10 which, once filled, gives a control pulse which passes through the OR gate 11 and causes the selector 14 to advance. Similarly, this pulse is applied to a monostable delay trigger circuit 12 which, through the OR gate 13, which may also be controlled manually, causes the counter 10 to return to zero.

The selector 14 is followed by a decoder 16 which controls the advance movement of the programme from A to P on the diode matrix 17. The advance of the selector may also be controlled through the gate 11 by an order coming from output $b$ if the authorisation for transfer through the gate 15 is given by the statement of equality at the output of the digital comparator 18.

The outputs $c$–$l$ of the diode matrix 17 are connected to a digital comparator 18 which compares the values appearing at the various outputs, as a function of position of the selector, with the values supplied by the digital pressure counter 19. This counter is positioned at the beginning of operation with the aid of the board 21 which may be controlled either manually or by means of the gate 22 which is open if there is a step and inequality between the two inputs of the digital comparator 18.

The counter 19 is followed by an analogue-digital-converter 20 connected to the input 3 of the comparator.

The contents of the counter 19 are modified by the pulses passing through the gate 23, opened if there is a command of linear decompression and a pulse delivered by the multivibrator 8. At 28 there is located a changeover switch, one of the inputs of which is connected to the output of the digital comparator 18, and the other giving the complementary state feeds the above described gate 22 and the AND gate 26 which opens only if the command for decompression is indicated at outlet $b$. The pulse passes through the OR gate 25 which is also open if there is a decompression step. The pulse feeds the gate 24 opened by the operation of the apparatus and triggers the time constant. A visual indicator 27 enables the course of the operations to be seen and effects the connection of the resistors in the multivibrator 8.

The operation of this assembly may be described as follows for a decompression step and for a linear decompression corresponding to two diodes fixed at two points of coordinates $Bb$ and $Ca$.

On column A, the pressure is indicated in the binary code. It is also indicated at 21. The comparator 4 is balanced and the pressure maintained, and the opening of the gate 24 triggers the multivibrator 8 which causes the counter 14 to advance by one unit and connects the column B of the diode matrix 17. On this column there has been fixed at $Bb$ the command for linear decompression and at $Bc$ to $Bl$ the desired value for stopping this decompression. The gate 23 is opened and each pulse coming from the multivibrator 8 causes the counter 19 to move back by one unit, thereby causing the comparator 4 to become unbalanced, and permitting the opening of the valve 5a. The contents of the counter 19 are permanently compared, in the comparator 18, with the quantity indicated at B on matrix 17, and as there is no equality, the gate 26 remains opened, thus permitting the multivibrator 8 to operate. The equality causes the gates 26 and 24 to close, and stops the operation of the multivibrator. Simultaneously, it causes the opening of the gate 15 and the advance of the programming counter 14. The selector is then positioned on the column C where a diode has been placed at the point of intersection of coordinates $Ca$ and the desired step is determined for the value of the pressure indicated at C. The indication of the degree has for an effect to open the gates 24 and 9, thus to permit the pulses produced by the multivibrator 8 to fill the counter 10. The latter being full, causes the selector to advance for the purpose of the following operation. The length of the step is determined by the duration of $n$ pulses of the multivibrator 8.

The invention may be used not only in experimental or systematic applications of decompression or recompression in all fields where a man may be subjected to abnormal conditions of pressure, but also in medical and surgical operations carried out under controlled pressure.

We claim:
1. Automatic decompression apparatus having a decompression chamber, and a sequential programmer that comprises
   (a) a member for controlling the internal pressure of said chamber, means for cyclically opening and closing said member to permit the execution of a programme of degrees of decompression and linear decompressions, and a diode matrix for setting up and indicating said programme;
   (b) means for comparing the voltage proportional to the pressure prevailing in said chamber with a voltage delivered by an analogue-digital-converter connected to a digital counter whose contents vary by one unit at periods of time defined by a multivibrator, when the value of the contents of said counter and the programmed value for the following decompression step are not equal; and
   (c) an alarm system associated with said comparison system for controlling the complete stopping of decompression in the case of ascertained anomaly, and for effecting an optional recompression.

2. Apparatus according to claim 1, wherein said diode matrix comprises a predetermined number of vertical columns and horizontal rows on which all the commands to be given for an operation are effected by elements fixed at points of determined coordinates.

3. Apparatus according to claim 2, wherein the switching over from one row to the following in said matrix is obtained by a programming selector associated with a decoder having $n$ positions, the advance of said programme selector being controlled by a pulse produced by said multivibrator.

References Cited
UNITED STATES PATENTS

| | | | |
|---|---|---|---|
| 1,224,180 | 5/1917 | Lake | 128—204 |
| 2,588,770 | 3/1952 | Sadler | 128—204 X |
| 2,830,580 | 4/1958 | Saklad et al. | 128—145.8 |
| 3,158,163 | 11/1964 | Claudy | 137—487.5 X |
| 3,225,725 | 12/1965 | Goike | 137—487.5 X |
| 3,357,428 | 12/1967 | Carlson | 128—145.8 |

RICHARD A. GAUDET, *Primary Examiner.*

WILLIAM E. KAMM, *Assistant Examiner.*

U.S. Cl. X.R.

137—487.5